United States Patent [19]

Van Paesschen

[11] 4,008,088
[45] Feb. 15, 1977

[54] MOTION PICTURE FILM MATERIALS CONTAINING MAGNETIC RECORDING STRIPES

[75] Inventor: August Jean Van Paesschen, Antwerp, Belgium

[73] Assignee: AGFA-GEVAERT N.V., Mortsel, Belgium

[22] Filed: May 20, 1975

[21] Appl. No.: 579,220

[30] Foreign Application Priority Data

May 24, 1974 United Kingdom ............ 23410/74

[52] U.S. Cl. .............................. 96/84 R; 96/87 R; 252/62.54; 427/131; 428/900
[51] Int. Cl.² .......................................... G03C 1/84
[58] Field of Search .......... 96/84, 87 R; 252/62.54; 156/330; 427/129, 131; 428/900

[56] References Cited
UNITED STATES PATENTS

| | | | |
|---|---|---|---|
| 3,704,167 | 11/1972 | Yamamoto et al. | 428/900 |
| 3,808,136 | 4/1974 | Stimson | 96/84 R |

*Primary Examiner*—John D. Welsh
*Attorney, Agent, or Firm*—William J. Daniel

[57] ABSTRACT

A multilayer motion picture film material comprises a support, at least one light-sensitive emulsion layer on one side of the support, and at the opposite side of the support an antihalation layer capable of being removed from the support in the presence of an alkaline solution. On this antihalation layer at least one stripe is applied from a coating composition containing magnetizable material dispersed in an alkali-insoluble binder and also containing a cross-linking agent for the alkali-soluble binder of the antihalation layer. As cross-linking agent is used at least one bis- or polyepoxide in combination with at least one sulphoxide and/or with formamide, the bis- or polyepoxide corresponding to one of the formulae:

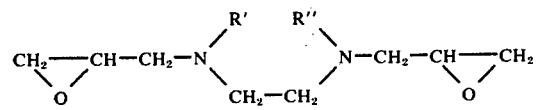

and

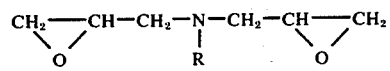

wherein R represents an alkyl group of 1 to 6 carbon atoms, a benzyl group, or a group of the formula

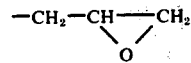

and each of R' and R" represents a methyl group, or a

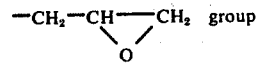 group or R' and R" together represent a —CH₂—CH₂— group.

11 Claims, No Drawings

MOTION PICTURE FILM MATERIALS CONTAINING MAGNETIC RECORDING STRIPES

The invention relates to motion picture film materials containing magnetic recording stripes and more particularly to a process for the application of a magnetic sound stripe to a motion picture film material.

Magnetic recording stripes are applied preferably to the rear side of the motion picture film support, the front side of the support being provided with a light-sensitive emulsion layer or layers. In general the rear side is provided with a backing layer that is removable and contains an alkali-soluble resin and a dye or pigment, which is most commonly carbon black, intended to provide antihalation protection and to shield the film from light when placed in the camera or removed in daylight. The backing layer is designed in such a way that it can be removed in alkaline solutions or in an alkaline solution followed by a water rinse.

In such a film it is obviously impractical to merely apply the magnetic recording stripe to the removable backing layer, since such layer will loosen partially or wholly from the support in the presence of an alkaline solution such as a developer, so that the magnetic recording stripe will be destroyed or damaged.

In the Belgian Patent Specification 778,160 filed Jan. 18, 1972 by Agfa-Gevaert N.V. a process is described for the application of magnetic recording stripes to a multilayer motion picture film material composed of a support, at least one light-sensitive emulsion layer, and at the opposite side of said support an antihalation layer capable of being removed from said support in the presence of an alkaline solution. The process comprises the application to the antihalation layer of stripes from a coating composition containing magnetisable material dispersed in an alkali-insoluble binder and in admixture therewith a cross-linking agent for the alkali-soluble binder of said antihalation layer.

The antihalation layer applied to the rear side of the motion picture film material comprises a dye or pigment, usually carbon black. The binder may be a cellulose derivative comprising free carboxyl groups, e.g. cellulose acetate phthalate, having a degree of acetyl substitution between 1.0 and 1.7 and a degree of phthalyl substitution between 0.6 and 1.2, a polymeric material comprising a sufficient amount of units carrying free acidic groups, e.g. a copolymer of styrene and maleic or (meth)acrylic acid, a copolymer of vinyl acetate and crotonic acid or (meth)acrylic acid, copolymers of alkyl (meth)acrylate and (meth)acrylic acid, or other polymeric material that is soluble or at least removable in an aqueous alkaline solution.

It is obvious that the cross-linking agent present in the sound stripe is to be adapted each time to the binder of the antihalation layer.

Normally not only a sound stripe is applied to the antihalation layer but also a narrow balance stripe of the same composition is applied to the edge of the film opposite to that of the sound stripe to facilitate rolling up of the motion picture film. Of course, the data given about the composition of the sound stripe also apply to the composition of the balance stripe.

According to the Belgian Patent Specification 778,160 filed January 18, 1972 by Agfa-Gevaert N.V. all bis- or polyfunctional compounds that can enter into reaction with the free acid group of the binder for the antihalation layer and thus accomplish cross-linking of the antihalation layer, can be added as cross-linking agents to the composition of the sound stripe. Such bis- or polyfunctional compounds comprise at least two reactive groups such as:
aziridine groups
epoxide groups
aldehyde groups
acryloyl or methacryloyl groups
groups containing reactive halogen atoms, e.g. sulphofluoride groups and -CH$_2$Cl groups, and
soluble metal complexes.

A multilayer motion picture film material has been found, which comprises a support, at least one light-sensitive emulsion layer on one side of such support, and, at the opposite side of said support, an antihalation layer capable of being removed from said support in the presence of an alkaline solution, and on said antihalation layer at least one stripe formed by the application thereto of a coating composition containing magnetizable material dispersed in an alkali-insoluble binder, said composition containing or being applied over a cross-linking agent for the alkali-soluble binder of said antihalation layer, characterized in that as a said cross-linking agent, at least one bis- or polyepoxide is used in combination with at least one sulphoxide and/or with formamide, said bis- or polyepoxide corresponding to one of the formulae:

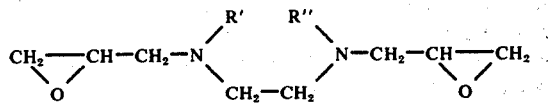

and

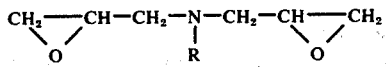

wherein:
R represents an alkyl group of 1 to 6 carbon atoms e.g. ethyl, propyl, butyl, hexyl, a benzyl group or a group of the formula

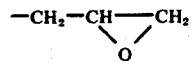

and each of R' and R" represents a methyl group, or a

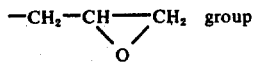 group or R' and R" together represent a —CH$_2$CH$_2$— group.

The invention also includes any process of forming a magnetic recording stripe on an antihalation layer of a photographic material, wherein the stripe is formed by applying magnetizable particles in an alkali-insoluble binder, together with or subsequent to the application of at least one said bis- or polyepoxide and at least one sulphoxide and/or formamide.

Very interesting results are obtained when in said coating composition of magnetizable material, 1 to 5% by weight of bis- or polyepoxide is present in respect of the total weight of solid material in said coating composition, and when at the same time the coating composition comprises from 1 to 10% by volume of sulphoxide or formamide in respect of the total volume of the coating composition before its application to the antihalation layer.

Suitable bis- or polyepoxides are e.g.:
N,N-bis(2,3-epoxypropyl)-ethylamine
N,N-bis(2,3-epoxypropyl)-isopropylamine
N,N-bis(2,3-epoxypropyl)-n-propylamine
N,N-bis(2,3-epoxypropyl)-butylamine
N,N-bis(2,3-epoxypropyl)-hexylamine
N,N-bis(2,3-epoxypropyl)-benzylamine
N,N'-bis(2,3-epoxypropyl)-N,N'-dimethyl-ethylenediamine
N,N-bis(2,3-epoxypropyl)-piperazine
tris(2,3-epoxypropyl)-amine
N,N,N',N'-tetrakis(2,3-epoxypropyl)-ethylenediamine Among the sulphoxides that can be used, preference is given to compounds that permit easy industrial application. Dimethyl sulphoxide is particularly advantageous. Symmetrical acyclic sulphoxides such as e.g. diethyl sulphoxide, dipropyl sulphoxide, dibutyl sulphoxide, or diisobutyl sulphoxide, asymmetrical acyclic sulphoxides such as e.g. methyl ethyl sulphoxide or methyl isobutyl sulphoxide, cyclic sulphoxides such as e.g. tetramethylene sulphoxide or polar heterocyclic sulphoxides such as e.g. tetrahydrothiophene-1,1-dioxide can be used also.

The use of the combination of at least one bis- or poly- epoxide according to the above formulae with a sulphoxide or with formamide in the magnetic composition has a synergistic effect on the insolubilization of the antihalation layer underneath the sound stripe. If the bis- or poly- epoxide is used alone, the insolubilization obtained of the different types of antihalation layers examined is not always sufficient to guarantee a perfect adhesion of the magnetic sound stripe. By the addition of sulphoxide or of formamide, e.g. in an amount of 1 to 10% by weight, a surprisingly marked reduction in the solubility of the antihalation layer and a marked improvement of the adhesion of the sound stripe to the antihalation layer are obtained in all types of antihalation layers examined, the bis- or polyepoxide used, comprising a substituted amino group and being as indicated in the formulae above.

Film-forming polymeric compounds that are insoluble in alkaline solutions can be used as binders for magnetizable material. Appropriate compounds of this type are cellulose esters and ethers, polymerisation products such as poly- vinyl chloride and polyvinyl esters, polyacryl compounds that are insoluble in alkali, polycondensation products such as alkyd resins, polyamides, polyesters, polyurethanes, etc. Mixtures of such binders can be used too, of course. Plasticizers for the binder, lubricating agents, and wetting agents can be added also to the coating solution used for forming the magnetic recording stripe.

Very interesting coating compositions for forming magnetic recording stripes are described in the United Kingdom Patent Specifications 986,473 filed Jan. 11, 1962, 991,675 filed Jan. 18, 1963, 1,058,425 filed June 15, 1964, all by Gevaert-Photo-Producten N.V., 1,080,614 filed Apr. 21, 1966, 1,152,651 filed May 16, 1966 and 1,153,316 filed Aug. 30, 1966, all by Agfa-Gevaert N.V.

Suitable supports for motion picture film are films made of film-forming polymers such e.g. as cellulose esters, e.g. cellulose triacetate, polycarbonates based on bis-hydroxy-phenylalkanes, or polyesters preferably polyethylene terephthalate.

In certain embodiments the bis- or polyepoxide and the sulphoxide or formamide are present in the coating composition containing the magnetizable material. This is the preferred procedure. However the invention can be carried out by applying to the antihalation layer, at the places to which the sound stripe and the balance stripe, if such is to be used, is or are to be applied, an intermediate layer comprising the mixture of bis- or polyepoxide with formamide or with a sulphoxide. This mixture in that case enters into reaction with the acid groups of the alkali-soluble binder of the antihalation layer to make this layer substantially insoluble in alkaline processing baths. This alternative procedure is not easy to apply and requires an additional step in the manufacture of the motion picture film material. So, as above stated, preference is given to the incorporation of the cross-linking agent for the alkali-soluble binder of the antihalation layer, together with sulphoxide or formamide, into the sound stripe itself. The hardening action is then necessarily effected on the portion of the antihalation layer directly under the stripe.

The good adhesion of a sound stripe containing the cross-linking agent and the sulphoxide or formamide can be checked in three different ways:
1. checking of the adhesion before processing in the photographic baths;
2. checking of the adhesion in an alkaline bath;
3. checking of the adhesion after processing.

Tests 1 and 3 are carried out by scratching the sound stripe by means of a knife, and then pressing a pressure-sensitive adhesive tape onto the scratches and subsequently, peeling the tape away. The sound stripe must not be damaged.

Test 2 is carried out by rubbing the wet rear side of the film material with the fingers. The sound stripe should remain intact.

The following examples illustrate the invention.

EXAMPLE 1

The rear side of a cellulose triacetate support, the front side of which had been provided with a known subbing layer and one or more light-sensitive emulsion layers for colour photography, was coated successively with the following layers:

a. an anticurling layer of cellulose diacetate having the following composition:

| | |
|---|---|
| cellulose acetate (D.S. acetyl 2.5) in the form of a 5 % solution in acetone | 100 ml |
| acetone | 750 ml |
| methanol | 75 ml |
| n-butanol | 75 ml |

The layer as coated at a ratio of 38 sq.m/liter.

b. an antihalation layer having the following composition:

| | |
|---|---|
| cellulose acetate phthalate (D.S. acetyl 1:30 - D.S. phthalyl 0.82) | 30 g |
| colloidal carbon having a particle size of 500 A | 8 g |
| ethylene glycol monomethyl ether | 250 ml |
| acetone | 150 ml |

| | |
|---|---|
| ethanol | 600 ml |

The layer was coated at a ratio of 30 sq.m/liter.

Narrow stripes of the following composition were then applied as sound stripe and balance stripe to the antihalation layer:

| | |
|---|---|
| magnetic iron oxide | 75 g |
| cellulose nitrate | 14 g |
| dioctyl phthalate | 8 g |
| VINSOL | 2 g |
| methyl ethyl ketone | 900 ml |
| isopropanol | 100 ml |
| N,N-bis(2,3-epoxypropyl)-isopropylamine | 2.5 g |
| dimethylsulphoxide | 50 ml |

VINSOL is the trade name of Hercules for a complex mixture of resinous components, including complex phenols, phenol ethers, and polyphenols.

Both stripes were coated in such a way that upon drying a thickness of 13 μm was obtained. The adhesion of the sound stripe as well as of the balance stripe to the carbon black containing antihalation layer was excellent. When a pressure-sensitive adhesive tape was applied to the stripes and then torn off at an acute angle, the stripes were left undamaged, even after the material had been scratched several times with a knife to facilitate the tearing off.

On normal processing of the photographic colour material, the carbon black layer was removed except under the sound and balance stripes. In comparative tests in which the bis-epoxide or the dimethylsulphoxide was omitted from the coating composition, the carbon black layer became removed under the edges of the sound and balance stripes during treatment in the photographic baths. Such a defect leads to the scaling of the sound stripe when in contact with the recording heads, the latter consequently becoming soiled. The said defect was confirmed also when a pressure-sensitive adhesive tape applied and pressed to the sound stripe was torn off. Both edges of the sound stripe were torn off very easily indeed.

EXAMPLE 2

One side of a cellulose triacetate support was coated with a known subbing layer and one or more light-sensitive emulsion layers for colour photography. The other side was coated with an anticurling layer of cellulose diacetate from the following coating composition:

| | |
|---|---|
| cellulose acetate (D.S. acetyl 2.5) as a 5 % solution in acetone | 100 ml |
| acetone | 750 ml |
| methanol | 75 ml |
| n-butanol | 75 ml |

This layer was coated at a ratio of 38 sq.m/liter.

Upon the dried anticurling layer an antihalation layer was coated at 35 sq.m/liter from the following composition:

| | |
|---|---|
| copolymer of vinyl acetate and crotonic acid (7.8 % by weight of crotonic acid) | 23 g |
| copolymer of styrene and acrylic acid (30 % by weight of acrylic acid) | 4 g |
| shellac | 2.5 g |
| colloidal carbon black having a particle size of 400 A | 11 g |
| HEXAPON D | 0.5 g |
| GAFAC RM 710 | 0.5 g |
| water | 635 ml |
| methanol | 350 ml |
| 25 % aqueous solution of ammonia | 15 ml |

HEXAPON D is the trade name of a compound sold by Societe Chimique Elbeuvienne, France, and corresponds to the formula:

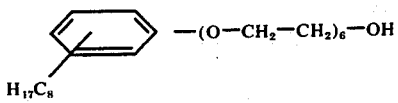

GAFAC RM 710 is the trade name for a product sold by General Aniline and Film Corporation, U.S.W., for a mixture of organic phosphates corresponding to the formulae:

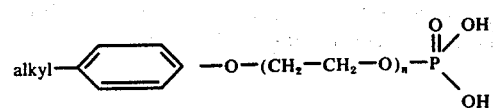

and

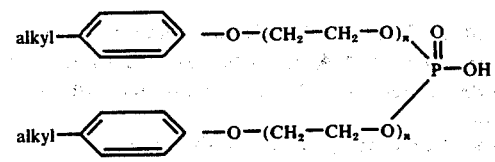

Both products were added as coating aids to the composition for the antihalation layer.

After drying narrow stripes of sound stripe and balance stripe were applied to this antihalation layer from the following composition:

| | |
|---|---|
| magnetic iron oxide | 210 g |
| cellulose nitrate | 60 g |
| dioctyl phthalate | 30 g |
| methyl ethyl ketone | 900 ml |
| isopropanol | 100 ml |
| N,N'-bis(2,3-epoxypropyl)piperazine | 7.5 g |
| formamide | 25 ml |

Both stripes were coated in such a way that upon drying a thickness of about 13 μm was obtained.

The adhesion of the sound and balance stripes of the antihalation layer before processing was excellent. After the photographic colour material had been processed in the usual photographic baths, the black antihalation layer had disappeared but remained fully intact at the placed covered by the sound and balance stripes.

EXAMPLE 3

A biaxially oriented polyethylene terephthalate film of 100 μm, the front side of which has been provided with a known subbing layer and one or more light-sensitive emulsion layers for colour photography, was coated on its rear side with a subbing layer from a copolymer of vinyl chloride, vinylidene chloride, n-butyl acrylate, and itaconic acid (63:30:5:2% by weight). The subbing layer was covered with an antihalation layer from the following coating composition:

| copolymer of vinyl acetate and crotonic acid (7.8 % by weight of crotonic acid) | 23.25 g |
|---|---|
| polymethylene p-hydroxybenzoic acid | 2.50 g |
| SETAMOL WS (trade-name) | 1.65 g |
| colloidal carbon black having a particle size of about 400 A | 10.00 g |
| GAFAC RM 710 (trade-name) | 0.50 g |
| SILICONE L 5310 (trade-name) | 0.50 g |
| water | 190 ml |
| methanol | 800 ml |
| 25 % aqueous solution of ammonia | 10 ml |

This coating composition was applied to the subbing layer at a ratio of 35 sq.m/liter.

The polymethylene p-hydroxybenzoic acid is the resin resulting from the polycondensation of p-hydroxybenzoic acid and formaldehyde. SETAMOL WS is the trade-name of Badische Anilin- und Sodafabriken, Germany for a polymethylene di-naphthalene disodium sulphonate corresponding to the formula:

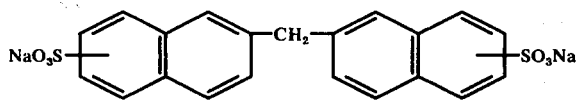

and SILICONE L 5310 is the trade name of Dow Chemical Co., U.S.A. for a silicone resin consisting of a block copolymer of dimethylsilicone with a polyether.

After the drying of the anthalation layer narrow stripes of sound stripe and balance stripe were applied thereto from the following composition:

| magnetic iron oxide | 213 g |
|---|---|
| copolymer of vinyl chloride, vinyl acetate and vinyl alcohol (91:3:6 % by weight) | 68 g |
| GAFAC RM 710 (trade name) | 4 g |
| n-butyl acetate | 600 ml |
| ethyl acetate | 400 ml |
| N,N-bis(2,3-epoxypropyl)-ethylamine | 7.5 g |
| formamide | 50 ml |

Both stripes were coated in such a way that upon drying a thickness of about 12 µm was obtained.

The adhesion of the sound and balance stripes to the antihalation layer before processing was excellent. After the photographic colour material had been processed in the usual photographic baths, the black antihalation layer had disappeared but it remained fully intact at the places covered by the sound and balance stripes.

When the bis-epoxide and/or formamide were omitted from the above coating composition for the sound and balance stripes, the black antihalation layer, had also disappeared under the edges of the sound and balances stripes after development in the usual photographic baths. This deficiency leads to the scaling of both stripes when in contact with the recording heads, which are soiled thereby.

EXAMPLE 4

A polyethylene terephthalate film having a thickness of about 0.35 mm, which had been oriented only longitudinally, was coated on both sides at a ratio of 80 sq.m/liter with an aqueous polymeric dispersion of a copolymer of vinyl chloride, vinylidene chloride, butyl acrylate, and itaconic acid (63:30:5:2% by weight). The aqueous dispersion had a concentration of 75 g of copolymer per liter.

The dried polyethylene terephthalate film was stretched transversally in a tenter frame to 3.5 times its original width, and thereafter heat-set for 2 seconds at 200° C.

The front side of the coated polyester film was coated with a subbing layer at a ratio of 30 sq.m/litre of the following coating composition:

| gelatin | 8 g |
|---|---|
| amorphous silicon dioxide | 12 g |
| caprolactam | 4 g |
| hexanetriol | 2 g |
| surface-active coating aids | 0.6 g |
| water | 600 ml |
| methanol | 400 ml |

The rear side of the polyester film was coated with an antihalation layer at a ratio of 30 sq.m/liter from the following coating composition:

| copolymer of ethyl acrylate, methyl methacrylate, and methacrylic acid (10:70:20 % by weight) | 11.4 g |
|---|---|
| colloidal carbon black having a particle size of about 400 A | 3 g |
| surface-active coating aids | 1.25 g |
| water | 600 ml |
| methanol | 400 ml |

One or more light-sensitive emulsion layers for colour photography were applied to the front side of the thus coated polyester film and the film was cut into long stripes as usual in cinematography. Magnetic recording and balance stripes were applied to the antihalation layer from the following coating composition:

| magnetic iron oxide | 213 g |
|---|---|
| copolymer of vinyl chloride, vinyl acetate and vinyl alcohol (91:3:6 % by weight) | 68 g |
| GAFAC RM 710 (trade name) | 4 g |
| oleic acid | 14 g |
| n-butyl acetate | 600 ml |
| ethyl acetate | 400 ml |
| N,N-bis(2,3-epoxypropyl)butylamine | 9 g |
| dimethyl sulphoxide | 50 ml |

After the photographic colour material had been processed in the usual photographic baths, the black antihalation layer had disappeared, but it remained fully intact at the places covered by the sound and balance stripes.

We claim:

1. A multilayer motion picture film material comprising a support, at least one light-sensitive emulsion layer on one side of such support and, at the opposite side of said support, an antihalation layer capable of being removed from said support in the presence of an alkaline solution, and also comprising, on said antihalation layer, at least one stripe formed by the application thereto of a coating composition containing magnetizable material dispersed in an alkali-insoluble binder, said composition containing a cross-linking agent for the alkali-soluble binder of said antihalation layer, characterized in that as a said cross-linking agent, at least one bis- or polyepoxide is used in combination with at least one sulphoxide and/or formamide, said bis- or polyepoxide corresponding to one of the formulae:

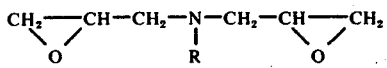

and

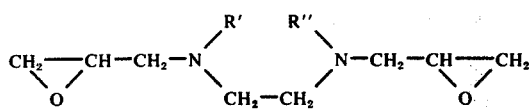

wherein R represents an alkyl group of 1 to 6 carbon atoms, a benzyl group, or a group of the formula

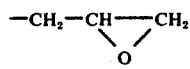

and each of R' and R" represents a methyl group, or a

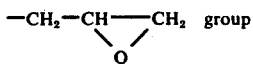

or R' and R" together represent a —CH₂—CH₂— group.

2. A multilayer motion picture film material according to claim 1 wherein said coating composition containing magnetizable material comprises 1 to 5% by weight of bis-or polyepoxide in respect of the total weight of solid material in said coating composition and from 1 to 10% by volume of sulphoxide or formamide in respect of the total volume of the coating composition.

3. A multilayer motion picture film material according claim 1, wherein the support is a film of cellulose triacetate.

4. A multilayer motion picture film material according to claim 1, wherein the support is a film of polyethylene terephthalate.

5. A multilayer motion picture film material according to claim 1, wherein the alkali-soluble binder for said antihalation layer is cellulose acetate phthalate having a degree of acetyl substitution between 1.0 and 1.7 and a degree of phthalyl substitution between 0.6 and 1.2.

6. A multilayer motion picture film material according to claim 1, wherein the alkali-soluble binder for said antihalation layer is formed of a copolymer of vinyl acetate and crotonic acid containing 7.8% by weight of crotonic acid.

7. A multilayer motion picture film material according to claim 1, wherein the alkali-soluble binder for said antihalation layer is a copolymer of ethyl acrylate, methyl methacrylate and methacrylic acid (10:70:20% by weight).

8. A multilayer motion picture film material according to claim 1, wherein N,N-bis (2,3-epoxypropyl)-isopropylamine is used as the or a said cross-linking agent.

9. A multilayer motion picture film material according to claim 1, wherein N,N-bis (2,3-epoxypropyl)-ethylamine is used as the or a said cross-linking agent.

10. A multilayer motion picture film material according to claim 1, wherein N,N'-bis(2,3-epoxypropyl)-piperazine is used as the or a said cross-linking agent.

11. A multilayer motion picture film material according to claim 1, wherein at least one said bis- or polyepoxide is used in combination with dimethyl sulphoxide.

* * * * *